J. M. DODGE.
PROCESS OF MANUFACTURING CHAIN LINKS.
APPLICATION FILED MAY 28, 1909.
1,008,891.
Patented Nov. 14, 1911.
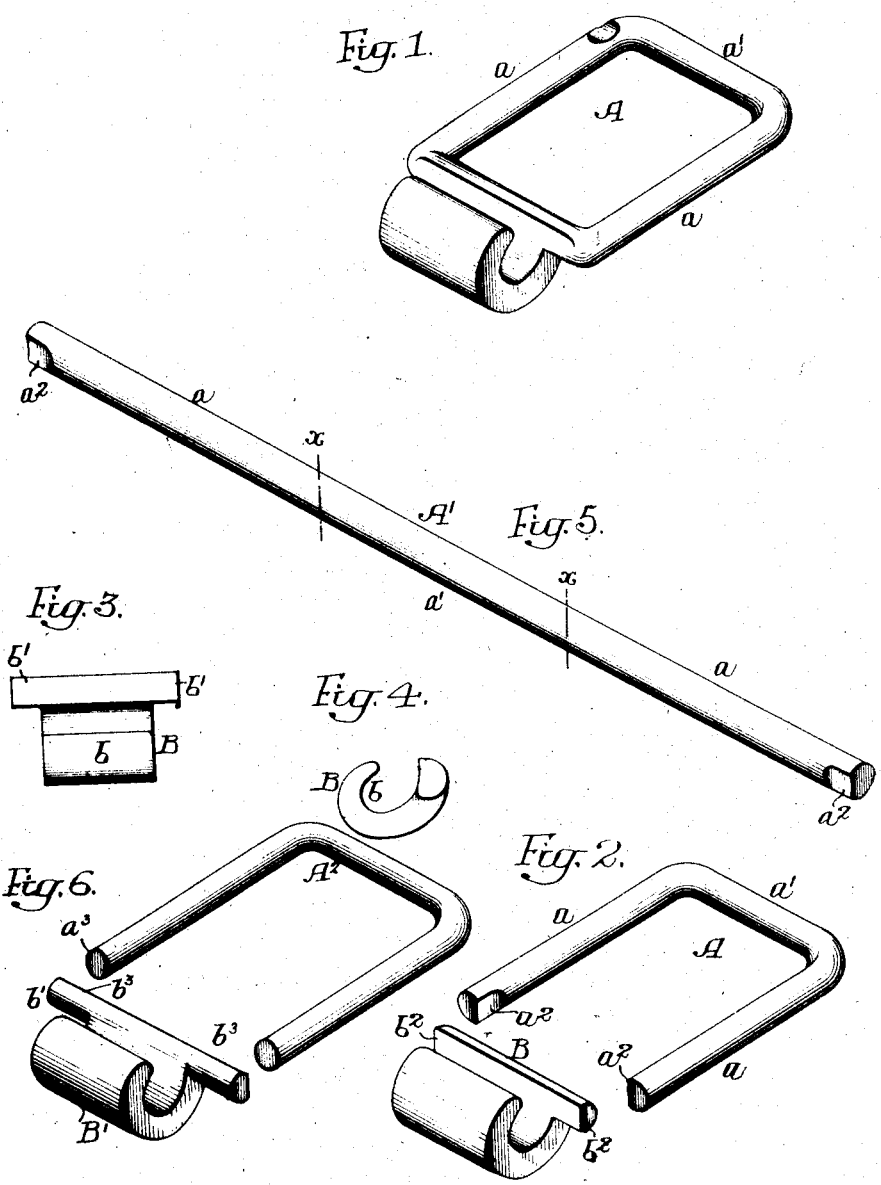
Witnesses:
Titus H. Irons
Nella A. Burrowes
Inventor:
James M. Dodge.
by his Attorneys,
Howson & Howson

UNITED STATES PATENT OFFICE.

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

PROCESS OF MANUFACTURING CHAIN-LINKS.

1,008,891.  Specification of Letters Patent.  Patented Nov. 14, 1911.

Application filed May 28, 1909. Serial No. 498,853.

*To all whom it may concern:*

Be it known that I, JAMES M. DODGE, a citizen of the United States, residing in Philadelphia, Pennsylvania, have invented certain Improvements in Processes of Manufacturing Chain-Links, of which the following is a specification.

The object of my invention is to make an open rectangular detachable chain link from wrought rods or shapes welded together, the rod forming the body portion of the link and the shaped section forming the hook member.

In the accompanying drawing:—Figure 1, is a perspective view of a chain link made in accordance with my invention; Fig. 2, is a view showing the two parts of a link shaped ready for welding; Fig. 3, is a plan view of the hooked portion of the link; Fig. 4, is an end view of the same; Fig. 5, is a perspective view of the rod from which the body portion of the link is made; and Fig. 6, is a view illustrating a modification of the invention.

Open rectangular detachable links are usually made of a single piece of malleable iron and great care must be exercised in manufacturing these links so as to detect the presence of any blow holes or other defects in the casting, before they are used. By making the link of wrought metal rods and shapes, the above defects are entirely avoided and if the weld is properly made a very strong link is the result.

Referring to the drawing, A is the open rectangular link having side bars $a$, $a$ and a transverse bar $a'$ at one end, and a hooked member at the opposite end. The body portion of the link is made by bending a bar A′, as illustrated in Fig. 5, at the points $x$, $x$, to form the cross bar $a'$ and the side bars $a$, $a$; the bar being notched in the present instance at each end $a^2$ to provide a comparatively flat surface where it is welded to the hooked member B.

The hooked member is made as shown in Figs. 3 and 4, having a hooked portion $b$; the opening in the hook being of sufficient diameter to receive the cross bar $a'$ of an adjoining link. The rear end of the hooked member B is extended at each end as shown at $b'$ to form, when welded to the body portion A, one end of the link. The rear end of the hooked member is of such a length as to fit between the recessed ends $a^2$ of the bar, as illustrated in Fig. 2, so that all that is necessary is to assemble the two parts and pass an electric current through them, welding the two surfaces $a^2$ and $b^2$ together, making a very substantial link.

In Fig. 6, I have shown a modification in which the extensions $b'$ are longer than the link illustrated in Fig. 2, and the ends of the bars $A^2$ are not notched at each end, but the contact is made by the ends $a^3$ of the bar coming in contact with the surfaces $b^3$ of the hooked member B′.

By the above process I make the body portion of the link from bars or rods cut into given lengths and bent to shape, and the hooked member I can shape in suitable dies, so that all that is necessary is to provide means for assembling the two parts of the links and welding them, preferably by the electric process.

Any welding process may be used in welding, and it will be understood that the contacting surfaces may be shaped as desired to produce a perfect weld.

I claim:—

The process herein described of making chain links of the class specified, said process consisting in bending a rod to a U-shaped form to produce a body portion having two side bars and a cross bar, forming a hook section, with a hook and lateral extensions at the rear of the hook, said lateral extensions being in contact with the ends of the side bars, and uniting the said side bars to the lateral extensions of the hook member, forming a unitary structure, with a plain cross bar at one end and a hooked bar at the opposite end.

In testimony whereof, I have signed my name to this specification, in the presence of two subscribing witnesses.

JAMES M. DODGE.

Witnesses:
 WM. E. SHUPE,
 WM. A. BARR.